US010436250B2

(12) United States Patent
Shimoda et al.

(10) Patent No.: US 10,436,250 B2
(45) Date of Patent: Oct. 8, 2019

(54) RETAINER FOR THRUST BEARING AND THRUST BEARING

(71) Applicant: NTN CORPORATION, Osaka (JP)

(72) Inventors: Masato Shimoda, Mie (JP); Yuusuke Doi, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/579,929

(22) PCT Filed: Jun. 3, 2016

(86) PCT No.: PCT/JP2016/006578
§ 371 (c)(1),
(2) Date: Dec. 5, 2017

(87) PCT Pub. No.: WO2016/195068
PCT Pub. Date: Dec. 8, 2016

(65) Prior Publication Data
US 2018/0223905 A1    Aug. 9, 2018

(30) Foreign Application Priority Data

Jun. 5, 2015  (JP) ................................. 2015-114787
Jun. 5, 2015  (JP) ................................. 2015-114797

(51) Int. Cl.
*F16C 33/38*    (2006.01)
*F16C 19/10*    (2006.01)
*F16C 33/44*    (2006.01)

(52) U.S. Cl.
CPC .......... *F16C 33/3887* (2013.01); *F16C 19/10* (2013.01); *F16C 33/38* (2013.01);
(Continued)

(58) Field of Classification Search
CPC .. F16C 19/10; F16C 33/38; F16C 3/44; F16C 33/3856; F16C 33/3843; F16C 33/3887;
(Continued)

(56) References Cited

U.S. PATENT DOCUMENTS 848,776 A * 4/1907 Sisson ..................... F16C 19/08
29/441.1
3,414,341 A * 12/1968 Murphy .............. B29C 47/0801
384/147
(Continued)

FOREIGN PATENT DOCUMENTS

CN    203348330 U    12/2013
EP    1956072 A1    8/2008
(Continued)

OTHER PUBLICATIONS

International Search Report for PCT/JP2016/066578 dated Aug. 16, 2016.
(Continued)

*Primary Examiner* — Marcus Charles
(74) *Attorney, Agent, or Firm* — Hedman & Costigan, P.C.; James V. Costigan; Kathleen A. Costigan

(57) ABSTRACT

To provide a retainer for a thrust bearing, which is to be assembled and decomposed regularly for being washed, having superior ball retaining performance itself and being attached and detached easily, and a thrust bearing having the retainer. A retainer for a thrust bearing 1, which retains a plurality balls intervened between a pair of raceway rings in a thrust bearing, is formed of a ring shaped plate member 2 formed of an injection molded body of a resin composition containing fluororesin, which is capable of injection molding, as a base resin. The ring shaped plate member 2 includes a plurality of ball pockets 3 in a circumferential direction of a ring shape. Each of the ball pockets 3 includes a claw portion divided into two portions 3a or more to retain a ball (Continued)

5 in a detachable manner. The claw portion 3a is defined by a slit 4 formed on at least one surface 2a among facing surfaces of the ring shaped plate member 2 facing raceway rings, the slit 4 being formed around an opening 3d of the ball pocket 3.

7 Claims, 7 Drawing Sheets

(52) U.S. Cl.
CPC .......... *F16C 33/3856* (2013.01); *F16C 33/44* (2013.01); *F16C 2208/30* (2013.01); *F16C 2235/00* (2013.01)

(58) Field of Classification Search
CPC .............. F16C 33/4635; F16C 2208/30; F16C 2235/00; F61C 33/3875
USPC ........ 384/590, 606, 609, 614, 621, 617, 592
See application file for complete search history.

(56) References Cited

U.S. PATENT DOCUMENTS

| | | | | |
|---|---|---|---|---|
| 7,503,980 | B2* | 3/2009 | Kida | .................. C23C 16/4581 |
| | | | | 118/500 |
| 8,113,718 | B2* | 2/2012 | Ito | ............................. F02K 9/60 |
| | | | | 384/463 |
| 8,870,465 | B2* | 10/2014 | Miyamoto | .............. F16C 33/44 |
| | | | | 384/614 |
| 2009/0232432 | A1 | 9/2009 | Egami | |
| 2015/0252846 | A1* | 9/2015 | Sakamoto | ........... F16C 33/3887 |
| | | | | 384/614 |

FOREIGN PATENT DOCUMENTS

| | | | | |
|---|---|---|---|---|
| JP | 61-66223 | U | 5/1986 | |
| JP | 2000002245 | A * | 1/2000 | .............. F16C 33/38 |
| JP | 2000-065067 | A | 3/2000 | |
| JP | 2004-340290 | A | 12/2004 | |
| JP | 2006077964 | A * | 3/2006 | .............. F16C 33/38 |
| JP | 2007-107564 | A | 4/2007 | |
| JP | 2007-107565 | A | 4/2007 | |
| JP | 2008-019974 | A | 1/2008 | |
| JP | 2013-064496 | A | 4/2013 | |
| JP | 2014-168439 | A | 9/2014 | |
| WO | 2007/026868 | A1 | 3/2007 | |
| WO | WO-2015141642 | A1 * | 9/2015 | .............. F16C 19/10 |

OTHER PUBLICATIONS

English Abstract for JP 2014-168439 A dated Sep. 18, 2014.
English Abstract for JP 2004-340290 A dated Dec. 2, 2004.
English Abstract for JP 2000-065067 A dated Mar. 3, 2000.
English Abstract for JP 2013-064496 A dated Apr. 11, 2013.
English Claims for JP 61-66223 U dated May 7, 1986.
English Abstract for JP 2007-107565 A dated Apr. 26, 2007.
English Abstract for JP 2007-107564 A dated Apr. 26, 2007.
English Abstract for CN 203348330 U dated Dec. 18, 2013.
English Abstract for JP 2008-019974 A dated Jan. 31, 2008.

* cited by examiner (a)

(b)

(a)

(b)

(a)

(b)

RETAINER FOR THRUST BEARING AND THRUST BEARING

TECHNICAL FIELD

The present invention relates to a retainer for a thrust bearing, and a thrust bearing provided with the retainer. Especially, the present invention relates to a retainer for a thrust bearing used in a food producing device.

BACKGROUND ART

A food producing device is used when food materials or food products (or semi products) are mixed, kneaded, heated, dried, cooled, filled, wrapped or the like. As one example of the food producing device, a bean ham wrapping machine which is provided with, for example, a conveyance device, a nozzle device, a shutter device and the like so as to divide the food material continuously discharged from the nozzle device into a predetermined size or shape by using the shutter device, is known. Here, similar to other device, a component such as a bearing is mounted to the food producing device, and therefore it is necessary to keep the food producing device clean in food sanitation by preventing a food residue from flowing and entering into a food from such a component.

Conventionally, a food producing device for producing processed meat products, Japanese sweet buns or sweet buns, in which a nozzle device and a shutter device including a thrust bearing or the like can be attached to and detached from a driving portion, the food producing device being washed with water such as jet water, is proposed (see Patent Document 1). In the food producing device disclosed in Patent Document 1, a part of a driving box of the shutter device to which the nozzle device is mounted can be formed in a surface shape without a uneven shape because a mount portion with a stepped shape is not necessary to be formed in the part of the driving box, and therefore washing and drying of the food producing device are facilitated. Further, since a rotation gear body interlocked and connected to the nozzle device is not installed in the driving box, sealing performance of the driving box is enhanced and therefore washing with high pressure water such as jet water can be performed, and thereby efficiency of washing operation can be enhanced.

PRIOR ART DOCUMENTS

Patent Documents

Patent Document 1: JP 2014-168439 A

SUMMARY OF THE INVENTION

Problems to be Solved by the Invention

In the food producing device disclosed in Patent Document 1, when the nozzle device is detached and washed with water, each component is also decomposed and washed with jet water. The thrust bearing is also detached from the nozzle device and washed with water. As shown in FIG. 7, a conventional thrust bearing 11 is formed such that a ball 14 is intervened between a pair of raceway rings 15, 16 and the ball 14 is retained by a retainer 12. Since a ball pocket 13 of the retainer 12 is formed as a straight through hole, the ball 14 might be dropped off from the retainer 12 when washed with jet water. Further, when the ball 14 is assembled in the retainer 12, it is necessary to pay close attention to the assembling because the ball 14 is apt to be dropped off from the retainer 12 due to the structure described above.

Conventionally, in the thrust bearing used in such a kind of the device, a retainer is formed of carbon-containing polytetrafluoroethylene (PTFE) resin in order to enhance draining performance thereof after the washing with water.

However, the conventional PTFE retainer is black in color due to the contained carbon and therefore the retainer leads to an unfavorable impression in food sanitation. Especially, it is difficult to determine whether dirt is removed in washing. Further, since the whole surface of the retainer is produced by means of cutting processing, it is difficult to deal with mass production.

An object of the present invention is, in order to solve such a problem, to provide a retainer for a thrust bearing, which is assembled and decomposed regularly for being washed, having superior ball retaining performance itself and being attached and detached easily, and a thrust bearing provided with the retainer. Further, another object of the present invention is to provide a retainer for a thrust bearing, which is used in a food producing device, capable of dealing with mass production and capable of being used sanitarily, and a thrust bearing provided with the retainer.

Means for Solving the Problems

A retainer for a thrust bearing according to the present invention is formed to retain a plurality balls intervened between a pair of raceway rings in the thrust bearing. The retainer for the thrust bearing is formed of a ring shaped plate member. The ring shaped plate member includes a plurality of ball pockets in a circumferential direction of a ring shape. Each of the ball pockets includes a claw portion divided into two portions or more to retain the ball in a detachable manner. The claw portion is defined by a slit formed on at least one surface among facing surfaces of the ring shaped plate member facing the raceway rings, the slit being formed around an opening of the ball pocket.

A diameter of the opening of the ball pocket on the facing surface facing the raceway ring may be set to be smaller than a diameter of the ball. Further, a plate thickness of the ring shaped plate member may be set in a range between 50% and 80% of the diameter of the ball.

The claw portion may be formed only on one surface among the facing surfaces of the ring shaped plate member, and the slit may be formed up to a depth of a center portion in an axial direction of the ring shaped plate member.

The ring shaped plate member may be formed of synthetic resin. Further, the ring shaped plate member may be formed of an injection molded body of a resin composition containing fluororesin, which is capable of injection molding, as a base resin. Especially, the fluororesin may be formed of at least one of tetrafluoroethylene-parfluoro alkyl vinyl ether copolymer (PFA) resin, tetrafluoroethylene-hexafluoropropylene copolymer (FEP) resin, and tetrafluoroethylene-ethylene copolymer (ETFE) resin. Further, the resin composition may exclude a carbon-based compounding agent.

A thrust bearing according to the present invention includes a pair of raceway rings, a plurality of balls intervened between the raceway rings, and a retainer which retains the balls. The retainer is formed by the retainer for the thrust bearing according the present invention described above. Further, the ball may be formed of ceramics.

Effects of the Invention

The retainer for the thrust bearing is formed of the ring shaped plate member, and the ring shaped plate member includes a plurality of the ball pockets in the circumferential direction of the ring shape, and each of the ball pockets includes the claw portion divided into the two portions or more to retain the ball in a detachable manner, and the claw portion is defined by the slit formed on at least one surface among the facing surfaces of the ring shaped plate member facing the raceway rings, the slit being formed around the opening of the ball pocket. Thereby, the ball can be assembled in the ball pocket easily. Further, since the assembled ball is hardly dropped off from the ball pocket, it is not necessary to pay close attention to the assembling of the ball into the ball pocket. Since the ball can be attached to and detached from the ball pocket easily, superior handling performance of the ball in washing and decomposing can be obtained, and therefore the washing is facilitated.

Since the diameter of the opening of the ball pocket on the facing surface facing the raceway ring is set to be smaller than the diameter of the ball, the ball is not dropped off from the ball pocket when washed with water such as jet water, and therefore loss of the ball can be avoided.

Since the plate thickness of the ring shaped plate member is set in the range between 50% and 80% of the diameter of the ball, torque increasing in the bearing due to contact between the retainer and the raceway ring can be avoided.

Since the claw portion is formed only on one surface among the facing surfaces of the ring shaped plate member, an assembling direction of the ball to the ball pocket is set in one direction, and therefore superior assembling performance of the balls can be obtained. Further, since the claw portion and the slit are not formed on a facing surface opposite to the facing surface including the claw portion, producing of the retainer is facilitated. Further, since the slit is formed up to the depth of the center portion in the axial direction of the ring shaped plate member, elastic force generated by the claw portion can be optimized and strength of the claw portion can be sufficiently ensured.

Since the ring shaped plate member is formed of the synthetic resin, producing of the ring shaped plate member is facilitated. Further, rust is not generated on the ring shaped plate member after washing.

Since the ring shaped plate member is formed of the injection molded body of the resin composition containing fluororesin, which is capable of injection molding, as a base resin, the ring shaped plate member is molded by means of injection molding using heat melting molding. Thus, the retainer can be produced in large quantities at a low cost compared to a conventional PTFE retainer in which the whole surface of the retainer is formed by means of cutting processing.

Further, since fluororesin is contained as a base resin, superior non-adhesiveness can be obtained, and dirt can be removed easily when a driving portion is decomposed and washed, and thereby a time for the washing can be reduced. Especially, since PFA resin, FEP resin or ETFE resin is used as fluororesin, injection molding can be adopted and superior non-adhesiveness can be obtained (a contact angle with pure water is 96 degrees or more). Further, since the resin composition excludes the carbon-based compounding agent, in a case in which the fluororesin described above is contained as a base resin, the retainer can be prevented from being black in color and can be used sanitarily.

The thrust bearing according to the present invention includes a pair of the raceway rings, a plurality of the balls intervened between the raceway rings, and the retainer which retains the balls, and the retainer is formed by the retainer for the thrust bearing according the present invention described above. Thereby, the ball is prevented from dropping off when the washing with water such as jet water is performed. Especially, in a case in which the retainer is formed of the injection molded body of the resin composition containing fluororesin, which is capable of injection molding, as a base resin, the retainer can be used sanitarily while reducing a production cost, compared to the conventional PTFE retainer. Further, the ball is formed of ceramics, and thereby the thrust bearing can be used sanitarily as a food producing device.

MODE FOR CARRYING OUT THE INVENTION

Figure 1:
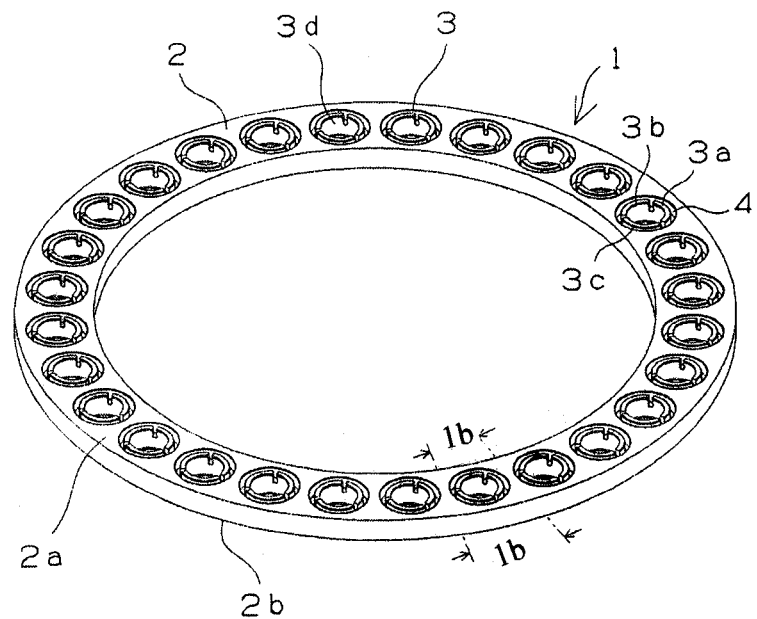
FIG. 1(a) is a perspective view and FIG. 1(b) is an enlarged view of section 1b-1b of FIG. 1(a) illustrating one example (three claw portions) of a retainer for a thrust bearing according to the present invention, respectively.
Figure 1:
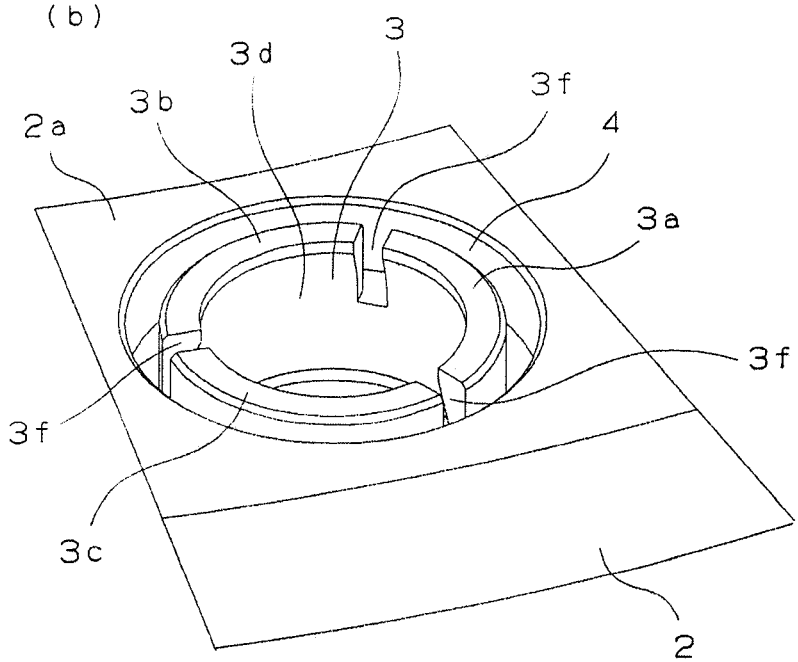
Figure 2:
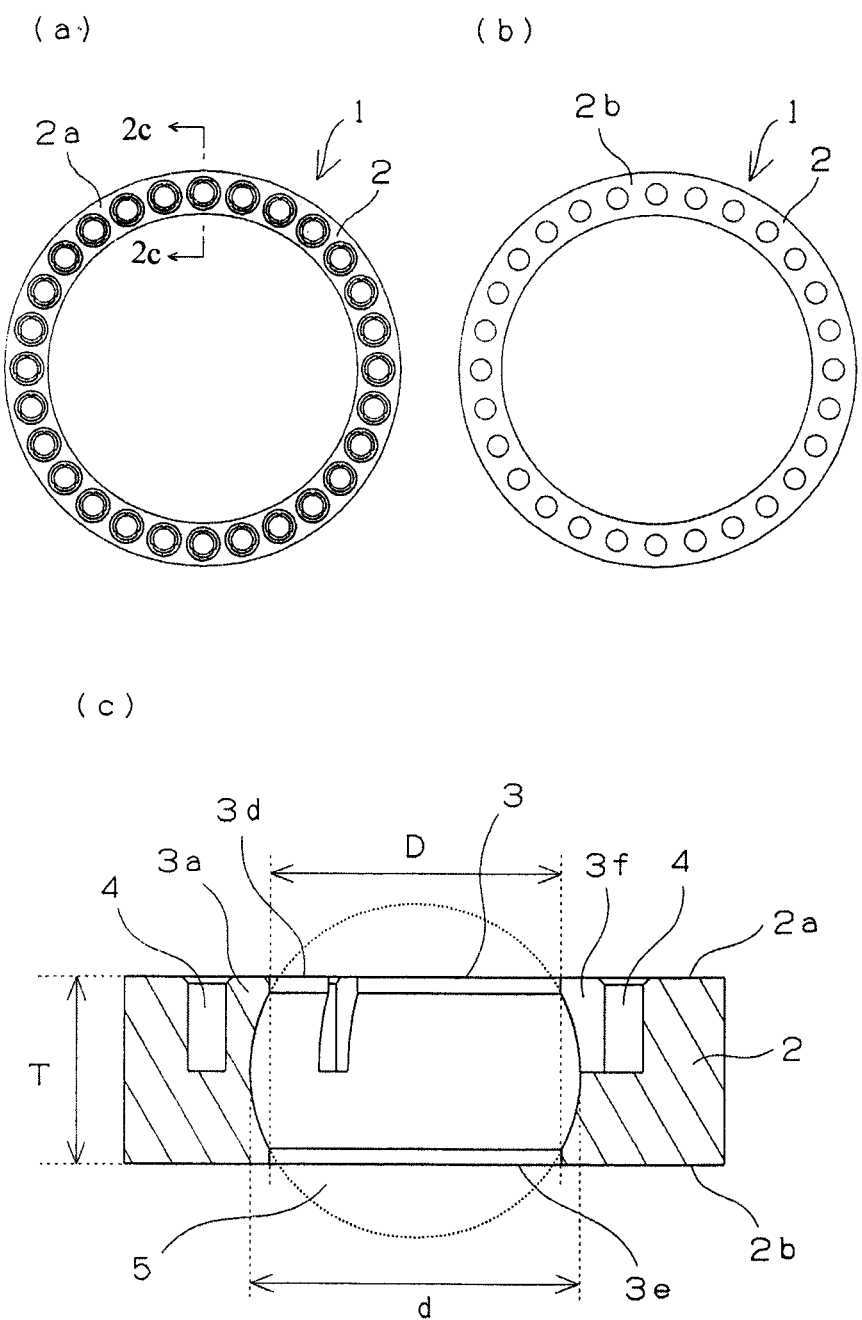
FIG. 2(a) through FIG. 2(b) are a plane view and a bottom view and FIG. 2(c) is an end face view of a cut part of section 2c-2c of FIG. 2(a) of the retainer in FIGS. 1(a) and 1(b), respectively.

As one embodiment of a retainer for a thrust bearing according to the present invention, a retainer for a thrust bearing provided with a claw portion divided into three portions is described with reference to FIGS. 1(a) and 1(b) and FIGS. 2(a) through 2(c). FIG. 1(a) is a perspective view of the retainer for the thrust bearing, and FIG. 1(b) is an enlarged view of 1b-1b in FIG. 1(a). FIG. 2(a) is a plane view of the retainer for the thrust bearing, and FIG. 2(b) is a bottom view of the retainer, and FIG. 2(c) is an enlarged cross-sectional view taken along line 2c-2c in FIG. 2(a). A retainer for a thrust bearing 1 is formed as a retainer used in a thrust bearing (thrust ball bearing). The retainer 1 retains a plurality of balls of the thrust bearing intervened between a pair of raceway rings of the thrust bearing in ball pockets 3. As shown in FIGS. 1(a) and 1(b), the retainer for the thrust bearing 1 is formed of a ring shaped plate member 2. The ring shaped plate member 2 is formed as a plate member formed in a ring shape (annular shape) and is provided with the ball pocket 3 which penetrates facing surfaces 2a, 2b facing the raceway rings. Each of the facing surfaces 2a, 2b is formed as a flat surface. The balls of the thrust bearing are retained by the ball pockets 3 at the same interval in a circumferential direction. In this embodiment, each of the ball pockets 3 is provided with the divided three claw portions 3a, 3b, 3c, which retain the ball in a detachable manner, formed integrally with the ring shaped plate member 2. Each of the claw portions 3a, 3b, 3c is formed by a portion (thin portion) defined by a slit 4 formed around an opening 3d of the ball pocket 3 on the facing surface 2a of the ring shaped plate member 2 facing the raceway ring. The claw portions 3a, 3b, 3c are formed by arranging three dividing gaps 3f, which are continued to the slit 4, on a substantially cylindrical thin portion which forms the opening 3d so as to equally divide the substantially cylindrical thin portion into three portions in the circumferential direction.

The claw portion and the slit may be formed on at last one surface among the facing surfaces of the ring shaped plate member facing the raceway rings. Further, the claw portions may be formed on different surfaces at each ball pocket. In the present invention, as shown especially in FIGS. 2(a) through 2(c), it is preferable that the claw portions are formed only on one facing surface (the facing surface 2a) of the ring shaped plate member 2 and the claw portions are not formed on opposite facing surface 2b. By forming the claw portions on one facing surface (side surface), an assembling direction of the ball to the ball pocket 3 is set in one direction, and therefore superior assembling performance of the balls can be obtained. Further, since the claw portions are not formed on another facing surface (side surface), producing of the retainer is facilitated compared to a configuration in which the claw portions are formed on both facing surfaces.

As shown in FIG. 2(c), the ball pocket 3 is provided with the opening 3d at a side of the facing surface 2a and an opening 3e at a side of the facing surface 2b on the ring shaped plate member 2, and the facing surfaces 2a, 2b are penetrated through these openings. An inner surface shape of the ball pocket 3 (including an inner surface of the claw portion) is a partially spherical shape along the ball 5. Each of opening diameters D of the opening 3d and the opening 3e is preferably smaller than a diameter d of the ball 5. With this, the ball 5 is prevented from dropping off from the ball pocket 3 when washed with water such as jet water. Here, a lower limit of the opening diameter D may be set to a diameter in which the ball can be assembled in the ball pocket through elastic deformation described below.

The slit 4 is preferably formed up to a depth of a center portion in an axial direction of the ring shaped plate member 2 (retainer). By setting a depth of the slit to the depth of the center portion in the axial direction of the retainer, elastic force of the claw portion can be optimized. Further, strength of the claw portion can be ensured sufficiently. Further, a size (a range in a circumferential direction and a radial direction) of the slit is appropriately set in a range in which necessary strength of the retainer can be obtained.

A plate thickness T of the ring shaped plate member 2 is preferably set in a range between 50% and 80% of the diameter d of the ball 5. More preferably, the plate thickness T is set in a range between 60% and 70% of the diameter d of the ball 5. Here, the claw portion of the retainer for the thrust bearing according to the present invention is formed of the thin portion defined by the slit formed around the opening of the ball pocket, and thereby the claw portion is not protruded from the side surfaces (the facing surfaces) of the retainer for the thrust bearing, and therefore the wall thickness T of the ring shaped plate member 2 is equal to a width of the retainer for the thrust bearing itself. Accordingly, by setting the width in the range described above, increase of torque caused by the retainer for the thrust bearing being contacted with the raceway ring can be prevented.

The ball 5 is assembled to the retainer while contacting the ball 5 with the claw portions 3a, 3b, 3c of the retainer for the thrust bearing and pressing the ball 5 toward the retainer to insert the ball 5 (see FIGS. 1(a) and 1(b)). The claw portions 3a, 3b, 3c have the dividing gaps 3f therebetween in the circumferential direction and the slit 4 is formed at an outer side of the claw portion 3a, and thereby the ball 5 having the diameter larger than the opening diameter of the opening 3d formed by the claw portions is fitted into the ball pocket 3 while displacing a circumferential edge of each claw portion toward the slit 4 and expanding the dividing gaps 3f due to elastic deformation of an inner surface of the ball pocket 3 to expand the diameter of the inner surface of the ball pocket 3 in a radial direction (see FIGS. 1(a) and 1(b) and FIGS. 2(a) through 2(c)). Further, the diameter of the inner surface of the ball pocket 3 at a side of the facing surface 2b not having the claw portions of the ball pocket 3 is not expanded in the radial direction, and therefore the ball 5 is not further moved after contacting with the inner surface of the ball pocket 3 at the side of the facing surface 2b, and thereby the position of the ball 5 is fixed (see FIGS. 2(a) through 2(c)). With this, the assembled ball 5 is retained by the ball pocket 3 in a state in which a part of the ball 5 is protruded from both of the facing surfaces 2a, 2b. In this state, by pressing the ball 5 from the side of the facing surface 2b not having the claw portions, the ball 5 is moved toward an outside while pushing each of the claw portions at a side of the facing surface 2a to expand the diameter of the ball pocket 3 in the radial direction. Consequently, the ball 5 can be removed from the retainer for the thrust bearing. The attaching and detaching operation can be performed by manual operation.

Figure 3:
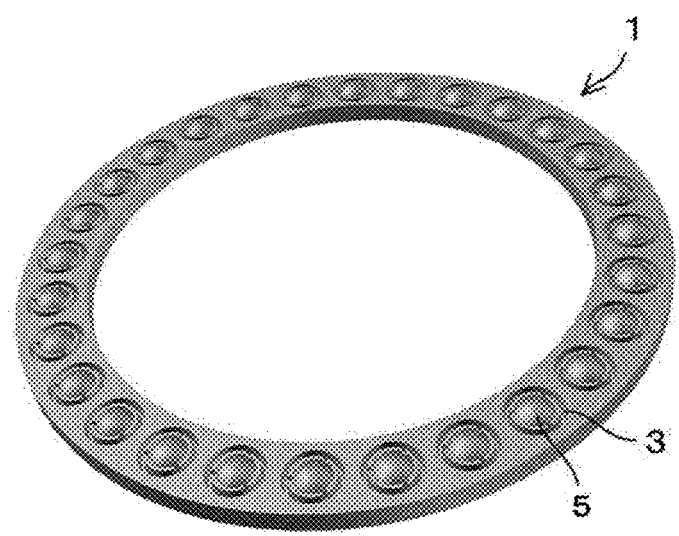
FIG. 3 is a view in which the retainer and balls are assembled.

As shown in FIG. 3, in the retainer for the thrust bearing 1 according to the present invention, the ball 5 can be retained in the ball pocket 3 by only the retainer without using the raceway ring. Further, the attaching/detaching of the ball to/from the retainer is performed easily. Thus, superior handling performance of the ball in assembling, washing and decomposing can be obtained.

Figure 4:
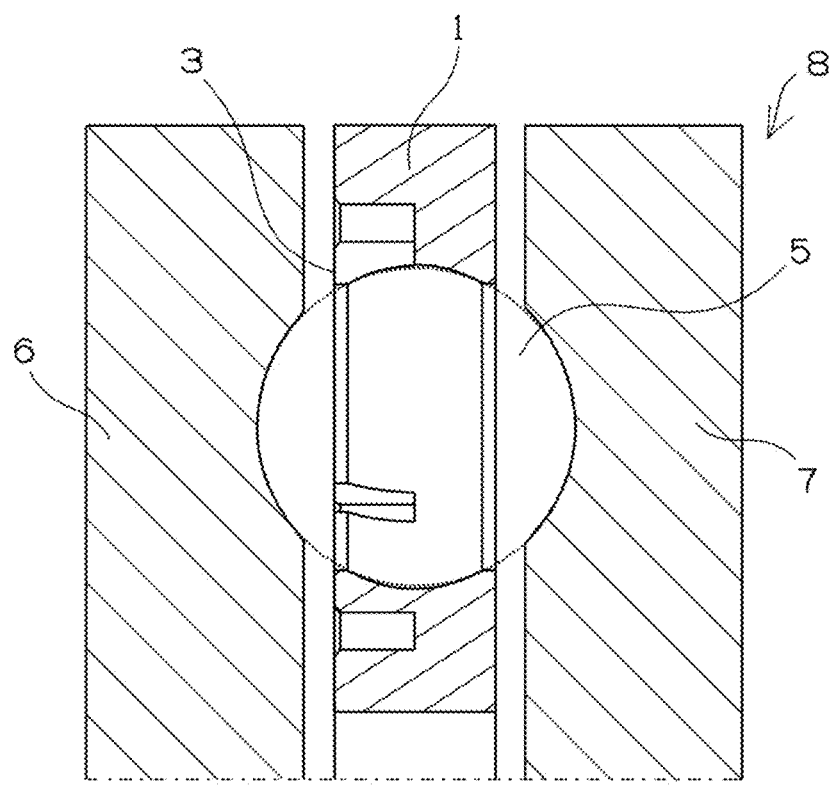
FIG. 4 is a cross-sectional view illustrating a part of one example of the thrust bearing according to the present invention.

As one embodiment of a thrust bearing according to the present invention, a thrust bearing using the retainer for the thrust bearing shown in FIGS. 1(a) and 1(b) through FIG. 3 is described with reference to FIG. 4. FIG. 4 is a cross-sectional view illustrating a part of the thrust bearing. As shown in FIG. 4, a thrust bearing 8 is provided with a pair of raceway rings 6, 7, a plurality of the balls 5 intervened between the raceway rings, and the retainer 1 which retains the balls 5 in the ball pockets 3. The retainer 1 is formed as the retainer for the thrust bearing described above. The ball 5 is rolled on a raceway groove of a pair of the raceway rings 6, 7. Since the retainer 1 itself can retain the ball 5, the ball 5 is prevented from dropping off from the ball pocket 3 when the bearing is washed with water such as jet water, and therefore washing is facilitated, and the retainer 1 is kept clean in food sanitation. Further, by adopting the ball 5 formed of ceramics, corrosion of the ball 5 can be prevented, and therefore the food producing device can be used sanitarily. Further, in a case in which the retainer 1 is formed of an injection molded body of fluororesin, the retainer 1 can be used sanitarily while reducing a production cost, compared to the conventional PTFE retainer.

Figure 5:
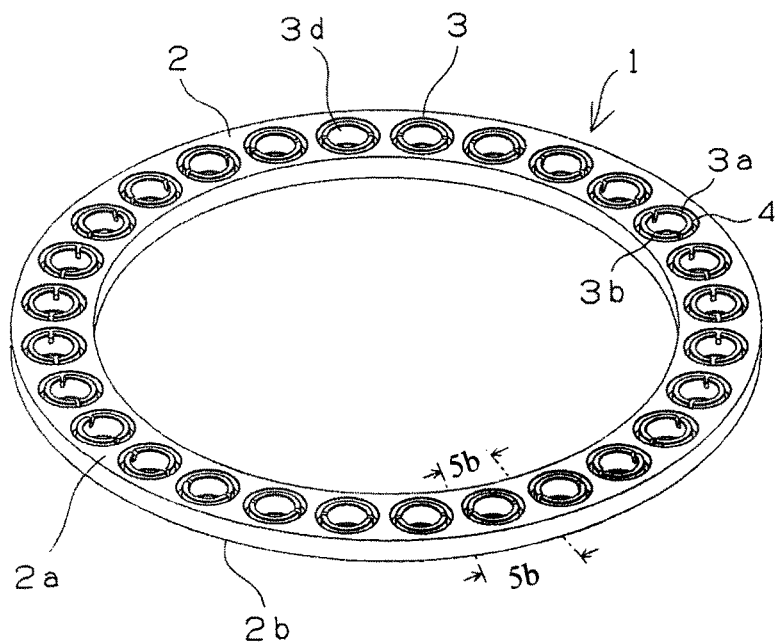
FIG. 5(a) is a perspective view and FIG. 5(b) is an enlarged view of section 5b-5b of FIG. 5(a) illustrating another example (two claw portions) of the retainer for the thrust bearing according to the present invention, respectively.
Figure 5:
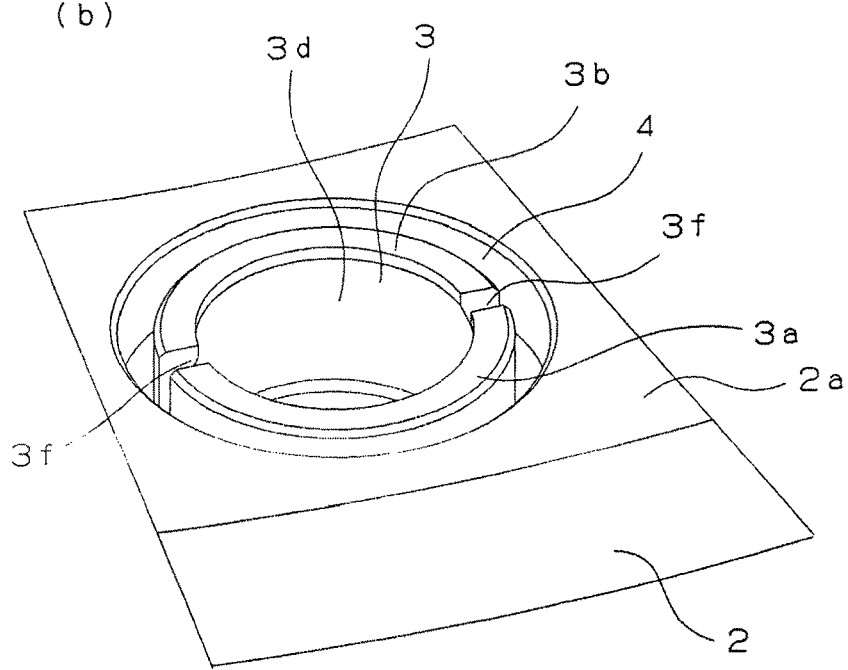
Figure 6:
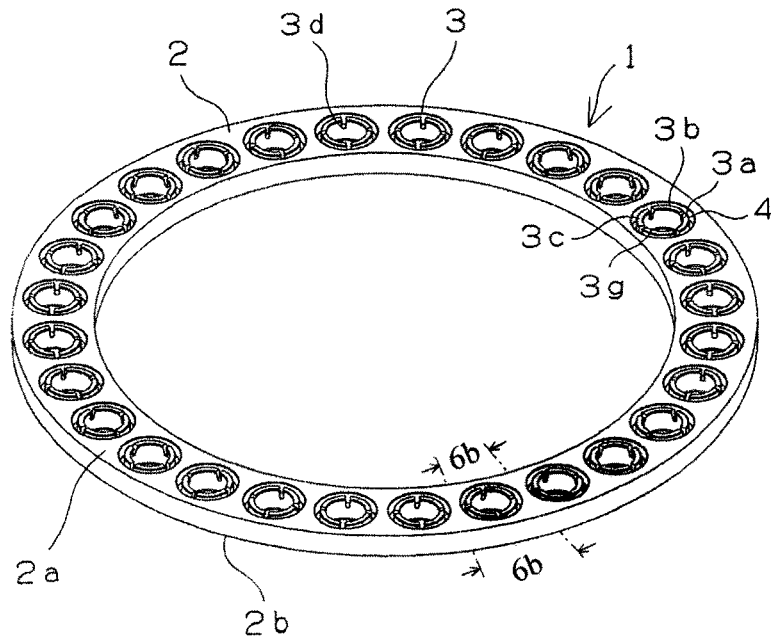
FIG. 6(a) is a perspective view and an FIG. 6(b) is an enlarged view of section 6b-6b of FIG. 6(a) illustrating another example (four claw portions) of the retainer for the thrust bearing according to the present invention, respectively.
Figure 6:
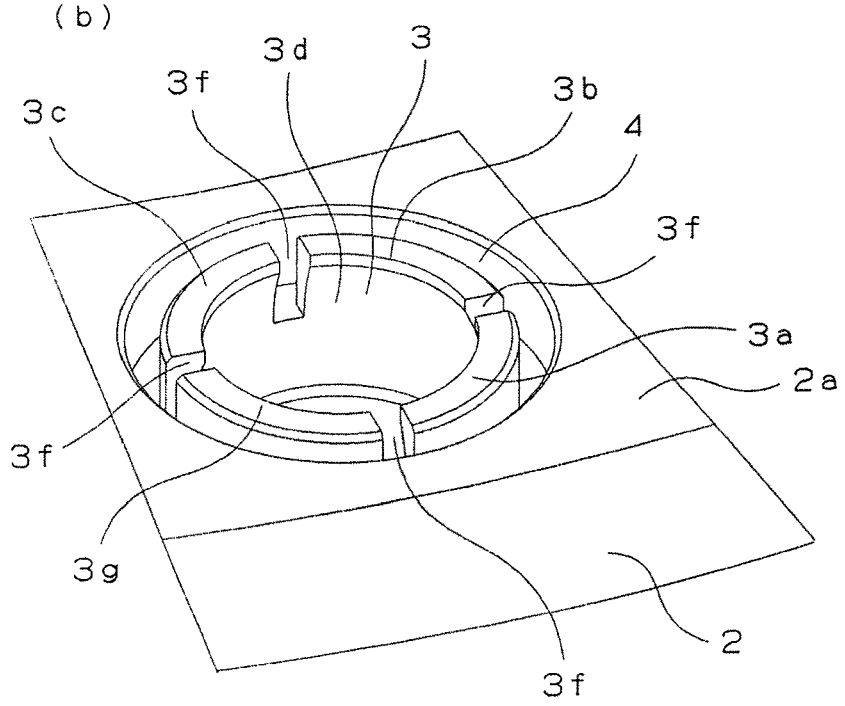
Figure 7:
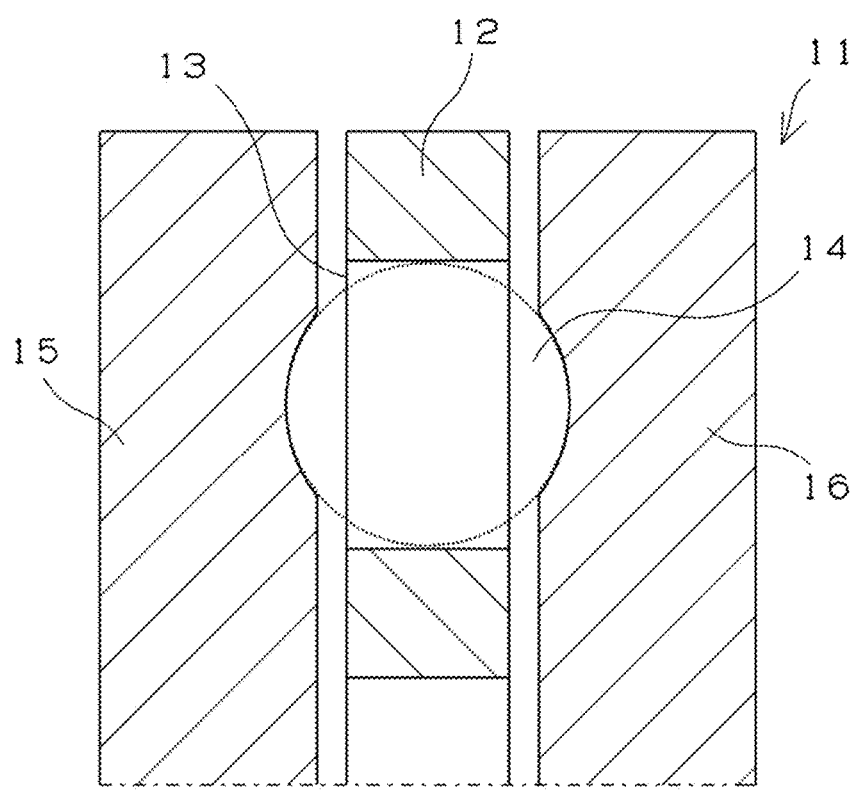
FIG. 7 is a cross-sectional view of a part of a conventional thrust bearing.

As other embodiment of the retainer for the thrust bearing according to the present invention, a retainer for a thrust bearing provided with a claw portion divided into two portions is described with reference to FIGS. 5(a) and 5(b), and a retainer for a thrust bearing provided with a claw portion divided into four portions is described with FIGS. 6(a) and 6(b). FIG. 5(a) is a perspective view of the retainer for the thrust bearing (two claw portions) and FIG. 5(b) is an enlarged view of 5b-5b. FIG. 6(a) is a perspective view of the retainer for the thrust bearing (four claw portions) and FIG. 6(b) is an enlarged view of 6b-6b. A configuration of the retainer for the thrust bearing 1 shown in FIGS. 5(a) and 5(b) is similar to that of the retainer shown in FIGS. 1(a) and 1(b) except a configuration of the ball pocket 3. In this embodiment, each of the ball pockets 3 is provided with divided two claw portions 3a, 3b, which retain the ball in a detachable manner, formed integrally with a ring shaped plate member 2. Each of the claw portions 3a, 3b is formed by a portion (thin portion) defined by a slit 4 formed around an opening 3d of the ball pocket 3 on a facing surface 2a of the ring shaped plate member 2 facing a raceway ring. The claw portions 3a, 3b are formed by arranging two dividing gaps 3f, which are continued to the slit 4, on a substantially cylindrical thin portion which forms the opening 3d so as to equally divide the substantially cylindrical thin portion into two portions in a circumferential direction.

A configuration of the retainer for the thrust bearing 1 shown in FIGS. 6(a) and 6(b) is similar to that of the retainer shown in FIGS. 1(a) and 1(b) except a configuration of the ball pocket 3. In this embodiment, each of the ball pockets 3 is provided with divided four claw portions 3a, 3b, 3c, 3g, which retain the ball in a detachable manner, formed integrally with a ring shaped plate member 2. Each of the claw portions 3a, 3b, 3c, 3g is formed by a portion (thin portion) defined by a slit 4 formed around an opening 3d of the ball pocket 3 on a facing surface 2a of the ring shaped plate member 2 facing a raceway ring. The claw portions 3a, 3b, 3c, 3g are formed by arranging four dividing gaps 3f, which are continued to the slit 4, on a substantially cylindrical thin portion which forms the opening 3d so as to equally divide the substantially cylindrical thin portion into four portions in a circumferential direction.

As described above, the configurations in which two through four divided claw portions are formed, are described with reference to FIGS. 1(a) and 1(b), FIGS. 5(a) and 5(b) and FIGS. 6(a) and 6(b), however the present invention is not limited to these configurations as long as two or more divided claw portions are formed. A configuration in which eight or less divided claw portions are formed is preferable in order to avoid deterioration of molding performance due to complexity of the structure. Among these, a configuration in which three divided claw portions are formed shown in FIGS. 1(a) and 1(b) is the most preferable because of superior balance between the ball retaining performance and the attaching and detaching performance and a simple shape.

Material of the ring shaped plate member which forms the retainer for the thrust bearing is not especially limited, however synthetic resin is preferable because producing of the ring shaped plate member is facilitated and rust is not generated after washing with water. Examples of the synthetic resin include polyacetal (POM) resin; nylon resin (nylon 6, nylon 66, nylon 610, nylon 612, nylon 11, nylon 12, nylon 46, semi-aromatic nylon having an aromatic ring in a molecular chain, or the like); fluororesin, which is capable of injection molding, such as tetrafluoroethylene-perfluoroalkyl vinyl ether copolymer (PFA) resin, tetrafluoroethylene-hexafluoropropylene copolymer (FEP) resin and ethylene-tetrafluoroethylene copolymer (ETFE) resin; polyimide resin capable of injection molding; polyphenylene sulfide (PPS) resin; liquid crystal polyester resin (LCP); polyether ether ketone (PEEK) resin; and polyamide-imide resin. Each resin may be used independently or polymer alloy compounding more than two of them may be used. Or alternatively, polymer alloy in which the synthetic resin described above is compounded into synthetic resin having poor lubrication characteristics other than the synthetic resin described above may be adopted. Further, glass fiber or various mineral fibers (whisker) may be compounded into the synthetic resin described above to reinforce the synthetic resin. Further, solid lubricant may be used together with the glass fiber or the various mineral fibers.

As a preferred embodiment according to the present invention, the ring shaped plate member is formed of an injection molded body of a resin composition containing fluororesin, which is capable of injection molding, as a base resin. The preferred embodiment is described below.

Such a resin composition may contain fluororesin as a base resin, and therefore the resin composition may be formed of a composition (fluororesin natural resin) consisting of fluororesin excluding other compounding agent. Examples of the fluororesin include PFA resin, FEP resin, and ETFE resin. Each fluororesin may be used independently or a mixture compounding more than two of them may be used. A stain resistance of the retainer formed of such fluororesin can be evaluated by using non-adhesiveness of the resin material, in particular the stain resistance can be evaluated by using a contact angle of the resin material with water. The contact angle of the PFA resin is 109 degrees, the contact angle of the FEP resin is 114 degrees, and the contact angle of the ETFE resin is 96 degrees, and the contact angles of these resins are superior. Especially, each of the PFA resin and the FEP resin has a contact angle closer to that of the PTFE resin (115 degrees) and therefore these resins have superior non-adhesiveness. The contact angle is measured by using a goniometer type measurement device (contact angle measurement device G-1 manufactured by Elmer optical Co.) at a temperature of 23 to 26° C. and humidity of 50 to 60%, after one second is passed since the pure water of 5 μl is dropped on a surface of the resin material.

Various compounding agents may be compounded to the resin composition, which forms the ring shaped plate member, containing such fluororesin as a base resin as long as the non-adhesiveness and the injection molding performance of the resin are not excessively deteriorated. For example, a reinforcing agent such as glass fiber or whisker may be compounded. The glass fiber is obtained by spinning inorganic glass containing $SiO_2$, $B_2O_3$, $Al_2O_3$, CaO, MgO, $Na_2O$, $K_2O$, $Fe_2O_3$ or the like as a main component, and alkali free glass (E glass), alkali-containing glass (C glass, A glass) can be used as the glass fiber. Among these, alkali free glass is preferable from a viewpoint of food sanitation. Further, as the whisker, silicon carbide whisker, silicon nitride whisker, potassium titanate whisker, aluminum borate whisker, zinc oxide whisker, magnesium sulfate whisker, magnesium whisker, magnesium borate whisker, calcium carbonate whisker, bismuth based whisker, magnesium oxide whisker, ceramics whisker or the like can be used. The glass fiber and the whiskers are white in color, and therefore the retainer becomes white in color in a configuration in which the glass fiber or the whisker is compounded into the resin. Thereby, such retainer is preferable because hygienic impression can be obtained.

The compounded amount of the reinforcing agent is preferably set in a range between 2 and 10 wt. % against the whole of the resin composition, more preferably set in a range between 3 and 8 wt. %. By setting the compounded amount of the reinforcing agent in the range described above, processing performance of the claw portion of the ball pocket or the like can be ensured while reinforcing the whole of the retainer.

A compounding agent other than the reinforcing agent may be compounded into the resin composition as needed.

Examples of other additive include a solid lubricant, and an inorganic filler. However, it is preferable that a carbon based compounding agent (carbon black, graphite, carbon fiber or the like), which causes the molded retainer to be black in color, is not included. By using fluororesin, which is translucent or white in color, as a base resin and by excluding a carbon based compounding agent, the retainer is made white in color, and therefore clean impression in food sanitation can be obtained. Further, it is easily determined whether the dirt is removed in washing, and an unwashed part is not remained. Further, by forming the ball by alumina ceramics which is white in color, the effect described above can be enhanced.

When the ring shaped plate member is injection molded by using the resin composition described above, any of methods of (1) forming a part to be the ball pocket by post-processing (cutting process) after injection molding the ring shaped plate member, and (2) forming the ring shaped plate member together with a part to be the ball pocket at the same time by injection molding can be adopted. Further, as an injection molding method, a known method can be adopted. In both methods of (1) and (2), the retainer can be produced in large quantities at a low cost compared to the conventional PTFE retainer in which the whole surface of the retainer is formed by means of cutting processing. Further, in the method of (2), the ball pocket is forcibly extracted, and therefore an inner surface shape of the ball pocket and composition of the resin composition are optimized.

INDUSTRIAL APPLICABILITY

The thrust bearing according to the present invention has superior ball retaining performance itself and is attached and detached easily, and therefore the thrust bearing can be suitably used in a use in which the thrust bearing is assembled and decomposed regularly for being washed, especially used as a bearing in a food producing device.

REFERENCE SIGNS LIST

1: retainer for thrust bearing
2: ring shaped plate member
3: ball pocket
4: slit
5: ball
6, 7: raceway ring
8: thrust bearing

The invention claimed is:
1. A retainer for a thrust bearing, which retains a plurality of balls intervened between a pair of raceway rings in a thrust bearing, the retainer for the thrust bearing being formed of a ring shaped plate member which is formed of synthetic resin,
wherein:
the ring shaped plate member is formed of an injection molded body of a resin composition containing an injection moldable fluororesin, as a base resin and includes a plurality of ball pockets in a circumferential direction of a ring shape;
each of the ball pockets includes a claw portion divided into two portions or more to retain the ball in a detachable manner;
the claw portion is defined by a slit formed on at least one surface among facing surfaces of the ring shaped plate member facing the raceway rings, the slit being formed around an opening of the ball pocket;
the claw portion is formed only on one surface among the facing surfaces of the ring shaped plate member; and
a diameter of an opening of the ball pocket on the facing surface opposite to the facing surface having the claw portion is set to be smaller than a diameter of the ball.
2. The retainer for the thrust bearing according to claim 1, wherein
the slit is formed up to a depth of a center portion in an axial direction of the ring shaped plate member.
3. The retainer for the thrust bearing according to claim 1, wherein a plate thickness of the ring shaped plate member is set in a range between 50% and 80% of a diameter of the ball.
4. The retainer for the thrust bearing according to claim 1, wherein the fluororesin is formed of at least one of tetrafluoroethylene-parfluoro alkyl vinyl ether copolymer resin, tetrafluoroethylene-hexafluoropropylene copolymer resin, and tetrafluoroethylene-ethylene copolymer resin.
5. The retainer for the thrust bearing according to claim 4, wherein the resin composition excludes a carbon-based compounding agent.
6. A thrust bearing comprising:
a pair of raceway rings;
a plurality of balls intervened between the raceway rings; and
a retainer which retains the balls,
wherein the retainer is formed by the retainer for the thrust bearing according to claim 1.
7. The thrust bearing according to claim 6, wherein the ball is formed of ceramics.

* * * * *